Aug. 19, 1924.
G. B. LINDQUIST
1,505,357
HOLDER FOR TREES AND THE LIKE
Filed March 6, 1923     2 Sheets-Sheet 1
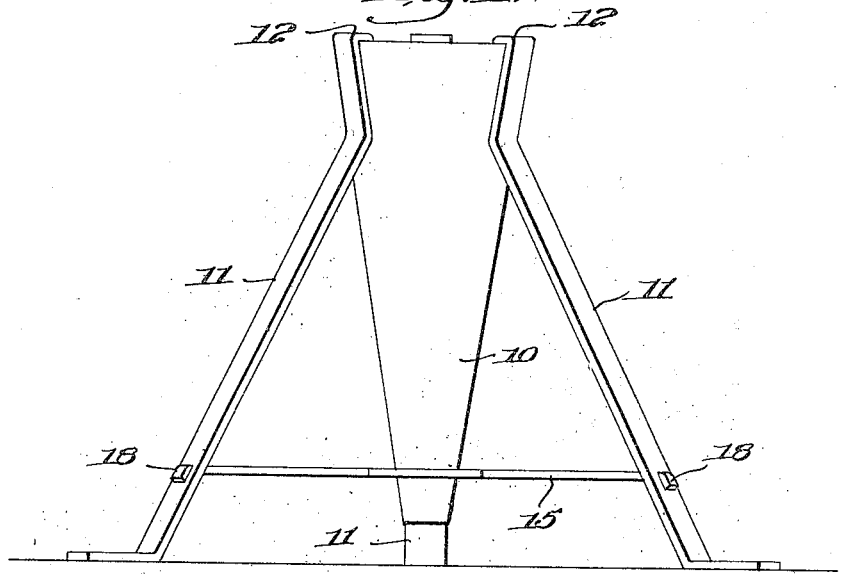
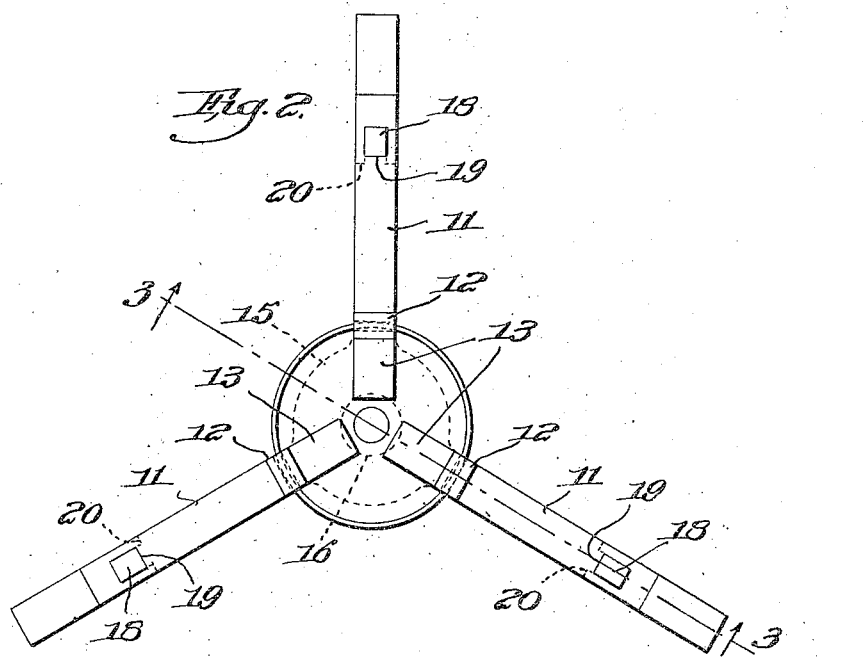

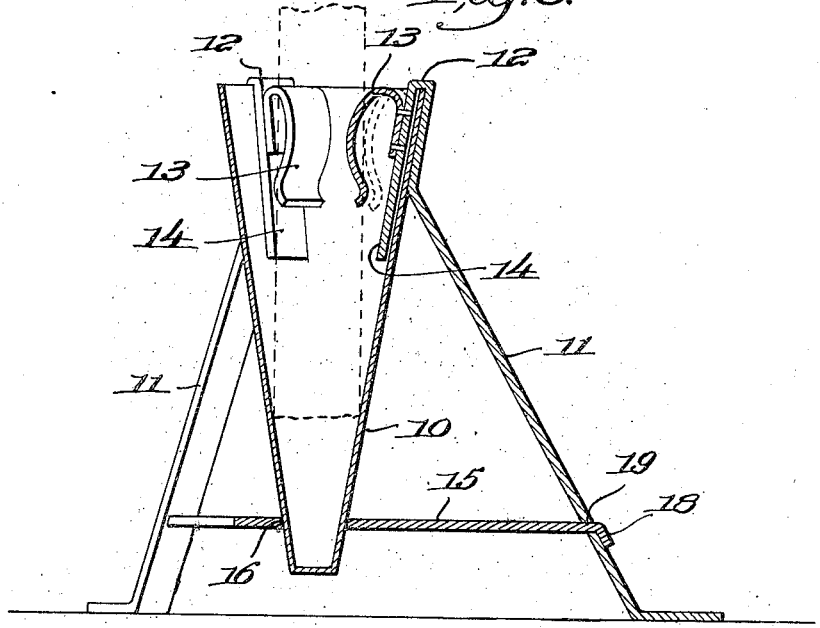
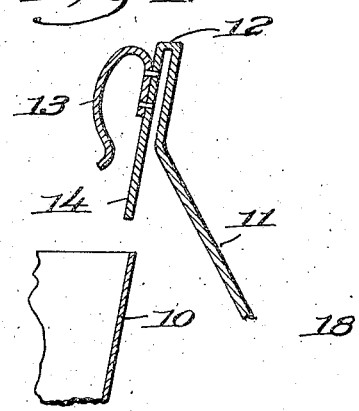
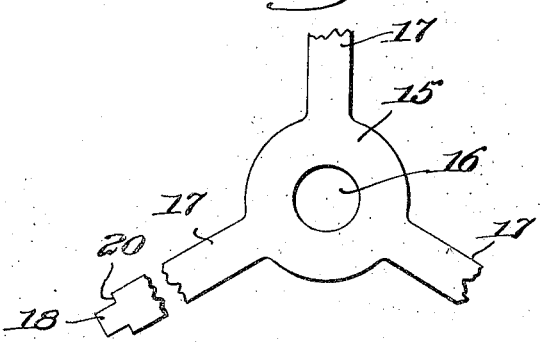

Patented Aug. 19, 1924.

1,505,357

UNITED STATES PATENT OFFICE.

GUSTAV B. LINDQUIST, OF SOUTH BRAINTREE, MASSACHUSETTS.

HOLDER FOR TREES AND THE LIKE.

Application filed March 6, 1923. Serial No. 623,107.

*To all whom it may concern:*

Be it known that I, GUSTAV B. LINDQUIST, a subject of the King of Sweden, and a resident of South Braintree, in the county of Norfolk and Commonwealth of Massachusetts, have invented certain new and useful Improvements in Holders for Trees and the like, of which the following is a specification.

This invention relates to holders for Christmas trees and the like, being particularly adapted for indoor use when trees are used for decorative purposes.

It is an object of the invention to produce a simple and efficient holder at low cost, that may be knocked down for the purpose of shipment or storage.

A further object of the invention is to produce a holder of this class having a trunk receiving and supporting member capable of holding a quantity of liquid, such as water, upon which the tree may feed to thereby prolong its life.

Another object of the invention consists in providing resilient tree centering means readily adaptable to tree trunks of various sizes, and which by reason of the close contact therewith relieves the holding member of a portion of its burden and transferring it to more stoutly built portions of the holder.

It is a further object of the invention to produce a tree holder, which may be erected, and knocked down times without number, of such construction and arrangement as to eliminate the necessity of set screws and the like, and wherein each part of the supporting structure coacts with its neighbor, to maintain the erected holder in comparatively rigid condition.

To the attainment of the above objects the invention consists in certain novel features of construction and arrangement of parts which will be fully understood from a description of the drawings and the claims hereinafter given.

Of the drawings:

Figure 1 represents in side elevation one embodiment of the invention.

Figure 2 a top plan view of Figure 1.

Figure 3 a section on the line 3—3 Figure 2.

Figure 4 detail similar to a portion of Figure 3 showing one of the legs as removed from the liquid containing supporting member.

Figure 5 a part top plan view of the spider-like brace which holds the supporting members, and ties the legs or props against spreading when in position for use.

Like characters represent like parts throughout the several figures of the drawings.

Referring to the drawings:

The drawings herewith show the holder as composed of a plurality of members so constructed and arranged, as to be assembled, to form a comparatively rigid device, which does not require the use of fastening devices such as set screws and the like.

A cone 10, herein referred to as the trunk receiving and supporting member, is preferably made of sheet metal and capable of holding a quantity of liquid such as water. A plurality of legs or props 11 have their upper ends bent to form hooks 12 and adapted to engage the large open end of the said cone 10, have heavy springs 13 permanently secured to the downwardly turned ends 14.

A spider-like brace 15 has an opening 16, see Figures 3 and 5, adapted to receive the small end of the cone 10 to thereby support it; the said brace having radiating arms 17 agreeing in number to that of the legs 11, said arms having reduced ends 18 adapted to enter holes 19 in said legs.

To assemble the holder, the cone is first inserted in the opening of the brace, and a leg hooked to the large end of the cone its radial angular position being determined by the position of the spider arm to which it is to be secured.

The reduced end of the spider arm is then inserted in the hole in the leg, provided therefor, until the shoulder 20 abuts the leg whereupon the protruding end is downwardly bent as seen in Figure 3.

Each leg is applied as above described until the holder is assembled, which requires but very little time, and tools, other than an instrument of some sort which may be handy, to turn the ends 18, not being necessary.

It is an object of the invention to provide a support for the tree trunk, and also provide means to center it, and for these purposes the cone 10 acts in conjunction with the resilient centering devices or springs 13.

Upon mounting a tree in the holder, the butt of the trunk will first contact with and compress the springs 13, and the tree will be forced downwardly into the cone until its end contacts with the walls thereof, which aid in sustaining the weight of the tree.

The springs at this time, being somewhat under compression and in close frictional contact with the trunk, relieve a portion of the tree weight from the cone and transfer it to the legs 11 with which they are secured.

In this way a considerable portion of the tree weight is transmitted to the more rugged portions of the holder best able to stand the strain, and at the same time the springs function to center the tree and retain it in approximately vertical position.

It is not known that a tree holder has ever been used wherein the several parts thereof may be assembled, to form a comparatively rigid structure, without the aid of securing means, such as screws and the like, and wherein the centering devices were so arranged as to also transfer a portion of the tree weight to the legs of the holder direct.

Nor is it known that a tree holder has ever been used having the above qualities together with a member which aids in sustaining and centering the tree, and which provides a receptacle for water upon which the tree may feed.

Having described the invention I claim:

1. In a tree holder of the class described, a conical receptacle adapted to receive tree trunks of various sizes; a plurality of supporting legs for said receptacle, said legs being conically arranged with respect to the axis of said receptacle and having their upper ends bent to form hooks which closely but loosely engage the inner and outer walls of the receptacle adjacent the mouth thereof for an appreciable distance whereby downward pressure imposed upon said receptacle will cause it to wedge between said legs and thereby obviate the necessity of fastening means between said receptacle and said legs.

2. In a tree holder of the class described, a conical receptacle adapted to receive tree trunks of various sizes; a plurality of supporting legs for said receptacle each comprising a strip of metal bent outwardly at the lower portion thereof to form a foot and at the upper portion to form a close hook arranged to straddle the rim at the mouth of said receptacle and to engage the inner and outer walls thereof for an appreciable distance along its length, said engagement being a loose one, whereby downward pressure exerted upon said receptacle will cause it to become wedged between said legs and thereby supported thus obviating the necessity of securing means between said receptacle and said legs; and means whereby said legs may be held from spreading.

3. In a knock down tree holder of the class described, a conical receptacle adapted to receive tree trunks of various sizes; a plurality of supporting legs for said receptacle and having their upper ends bent to form hooks which closely but loosely engage the inner and outer walls of said receptacle for an appreciable distance whereby downward pressure imposed upon said receptacle will cause it to become wedged between said legs thereby obviating the necessity of fastening means between said receptacle and said legs; and means to further support said receptacle and prevent spreading of said legs, said means being detachably arranged with respect to said receptacle and said legs.

4. In a knock down tree holder of the class described, a receptacle adapted to receive tree trunks of various sizes; a plurality of supporting legs for said receptacle in loose engagement therewith, said receptacle and said legs being of an arrangement whereby downward pressure imposed upon said receptacle causes it to wedge between said legs; and a detachable strut adapted to prevent said legs from spreading and to aid in the support of said receptacle.

Signed by me at Boston, Mass., this 3rd day of March, 1923.

GUSTAV B. LINDQUIST.